US005691923A

United States Patent [19]
Adler et al.

[11] Patent Number: 5,691,923
[45] Date of Patent: Nov. 25, 1997

[54] DIGITAL MEASURING SYSTEM

[75] Inventors: Maureen E. Adler, San Francisco, Calif.; Frederick N. Mueller, McKinney, Tex.

[73] Assignee: Levi Strauss & Co., San Francisco, Calif.

[21] Appl. No.: 428,671

[22] Filed: Apr. 25, 1995

[51] Int. Cl.$^6$ ............................................. G01B 3/08
[52] U.S. Cl. ............................. 364/562; 33/706; 33/707
[58] Field of Search ................................ 364/562, 561, 364/560; 33/679.1, 706, 707, 734, 735

[56] References Cited

U.S. PATENT DOCUMENTS

| | | | |
|---|---|---|---|
| 4,149,246 | 4/1979 | Goldman | 364/200 |
| 4,161,781 | 7/1979 | Hildebrandt et al. | 364/562 |
| 4,171,575 | 10/1979 | Blessing et al. | 33/134 R |
| 4,181,959 | 1/1980 | Tateishi et al. | 364/562 |
| 4,181,960 | 1/1980 | Tateishi et al. | 364/562 |
| 4,195,348 | 3/1980 | Kakutani | 364/562 |
| 4,200,982 | 5/1980 | Mueller et al. | 33/126.6 |
| 4,201,145 | 5/1980 | Blessing | 112/306 |
| 4,261,012 | 4/1981 | Maloomian | 358/93 |
| 4,406,544 | 9/1983 | Takada et al. | 356/376 |
| 4,427,883 | 1/1984 | Betensky et al. | 250/237 |
| 4,539,585 | 9/1985 | Spackova et al. | 358/93 |
| 4,598,376 | 7/1986 | Burton et al. | 364/470 |
| 4,635,367 | 1/1987 | Vigede | 33/15 |
| 4,705,401 | 11/1987 | Addleman et al. | 356/376 |
| 4,731,743 | 3/1988 | Blancato | 364/521 |
| 4,758,960 | 7/1988 | Jung | 364/470 |
| 4,807,143 | 2/1989 | Matsuura | 364/468 |
| 4,842,411 | 6/1989 | Wood | 356/376 |
| 4,876,758 | 10/1989 | Rolloff et al. | 12/142 |
| 4,900,144 | 2/1990 | Kobayashi | 351/206 |
| 4,905,159 | 2/1990 | Loriot | 364/470 |
| 4,916,624 | 4/1990 | Collins et al. | 364/470 |
| 4,949,286 | 8/1990 | Ohba | 364/521 |
| 5,426,863 | 6/1995 | Biggel | 33/707 |

FOREIGN PATENT DOCUMENTS

| | | | |
|---|---|---|---|
| 1068898 | 1/1980 | Canada . | |
| 1099912 | 4/1981 | Canada . | |
| 1115376 | 12/1981 | Canada . | |
| 1246860 | 12/1988 | Canada . | |
| 2057884 | 12/1990 | Canada . | |
| 1279474 | 1/1991 | Canada . | |
| 2054432 | 4/1992 | Canada . | |
| 2102121 | 1/1983 | United Kingdom | 364/562 |

Primary Examiner—Emanuel T. Voeltz
Assistant Examiner—Bryan Bui
Attorney, Agent, or Firm—Medlen & Carroll, LLP

[57] ABSTRACT

A digital measuring device is provided for electronically determining measured distances, such as the dimensions of people or objects, as an integral part of a comprehensive system for manipulating and/or recording the measurement data. The digital measuring system of the present invention includes a digital tape measure for transforming measured distances into electrical signals or representations, and a control and display means for manipulating and recording the data received from the digital tape measure into a useful format. The digital tape measure includes a measuring tape with regularly-spaced markers and an electronic sensing means for detecting the passage of the markers. The control and display means can be incorporated into the digital tape measure itself, or alternatively it can be a separate unit.

21 Claims, 6 Drawing Sheets

PCR AUDITING FORM — OUT OF SPEC REPORT

Womens • JR RED TAB, 550 RELAX

Memory Card ID: 00002  1/17/95

Memory Card Description: Men and Women's Measurements.

Product Code: 10550  
PCR Number:  
Auditor Name:  
Date: 4-06-95  18:53:47

Pattern Number: 04  
Plant: 573/953

After Wash OOT

| Measurement | Tolerance | Garment # 1 Size: 13 - Medium | | | Garment #2 Size: | | | Garment #3 Size: | | | Garment #4 Size: | | | Garment #5 Size: | | |
|---|---|---|---|---|---|---|---|---|---|---|---|---|---|---|---|---|
| | | Spec. | Gmt. | OOT | Spec. | Gmt. | OOT | Spec. | Gmt. | OOT | Spec. | Gmt. | OOT | Spec. | Gmt. | OOT |
| Waist | +1/2 -1/2 | 32 1/2 | 32 3/8 | | | | | | | | | | | | | |
| High Hip | +1/2 -1/2 | 38 5/8 | 38 3/4 | | | | | | | | | | | | | |
| Low Hip | +1/2 -1/2 | 42 3/8 | 42 3/4 | | | | | | | | | | | | | |
| Thigh | +1/2 -1/2 | 25 3/4 | 26 | | | | | | | | | | | | | |
| Knee | +1/2 -1/2 | 20 1/4 | 20 3/8 | | | | | | | | | | | | | |
| Bottom | +1/2 -1/2 | 132 1/2 | 13 12 | | | | | | | | | | | | | |
| Inseam | +1/2 -1/2 | 31 | 30 1/4 | -0 1/4 | | | | | | | | | | | | |
| Front Rise | +1/4 -1/4 | 11 3/4 | 11 3/4 | | | | | | | | | | | | | |
| Back Rise | +1/2 -1/4 | 15 1/2 | 15 3/8 | | | | | | | | | | | | | |

NOTE 1: Product Code: 10550  
NOTE 2: Patterns: 04

DIGITAL MEASURING SYSTEM

FIELD OF THE INVENTION

This invention relates to data acquisition and storage systems, and more particularly, to systems for measuring and recording distances and the dimensions of objects and people.

BACKGROUND OF THE INVENTION

The standard tape measure in its various forms has long been the device of choice when measuring shorter distances such as the dimensions of rooms, objects and people. However, proper use of this device requires the manual extension of the tape along the dimension or distance to be measured, a visual reading of the tape marker at the end point, and a manual transcription of the information obtained by use of the tape measure. This time-consuming and error-prone procedure, while perhaps appropriate for making simple, one-time measurements, is ill-suited to the repetitive and demanding measurement needs of the manufacturing industry.

The ability to quickly and accurately measure and record the physical dimensions of a manufactured article is a fundamental component of any manufacturing process, both during the manufacturing steps themselves and upon completion of the finished product. The dimensions of the article or articles must necessarily meet exacting standards to guarantee that the manufacturing steps have been properly performed, before continued manufacture or before distribution of the finished product.

In the garment and apparel manufacturing industries in particular, finished garments must routinely be put through rigorous quality control testing to ensure that the sizing is precise. Multiple measurements must be quickly and accurately made in different locations on the garment itself, at several different stages of production, and given the nature of the manufactured article, these measurements are typically taken by hand. This process is extremely time consuming, and discrepancies in measurement often arise. In addition, even accurate measurements can be transposed incorrectly when manually recorded by the worker, and this problem is compounded when mathematical manipulations must be done to the data before it is recorded. Moreover, a fatigued worker at the end of their shift is even more prone to making mistakes after repeatedly measuring, mentally calculating and manually recording the necessary information.

Although the measurement, calculation and recordation problems noted above may be somewhat less evident on a small scale, the current manual measuring process is still excessively time-consuming. And when measurements are performed on a large scale, as, for example, when creating a databank for future statistical analysis, the accuracy problems only multiply and the excessive time consumption of the current process becomes an unnecessary limiting factor. The prior art manual measuring system is simply too inaccurate, and is inadequate to fully interact with the automated production methods in use in the manufacturing industry today.

What is needed is a measuring system that will automatically measure and record distances and dimensions, without any need by the operator to visually identify the appropriate distance marker on a measuring tape and manually transcribe this information to a separate document or databank. Such a system should be able to automatically convert the measurement data into a useful format, perform any necessary calculations to arrive at the appropriate figure, compare the information obtained with programmed standards, and finally to accurately record the information.

SUMMARY OF THE INVENTION

Accordingly, it is an object of the present invention to substantially eliminate the problems encountered in prior art measuring systems, by providing a digital measuring device for electronically determining measured distances and the dimensions of people or objects, as an integral part of a comprehensive system for manipulating and/or recording the measurement data. In accordance with the present invention, a digital measuring system is provided which includes a digital tape measure for transforming measured distances into electrical signals or representations, and a control and display unit for manipulating and subsequently recording the digital data received from the tape measure device into a useful format.

In one embodiment the digital measuring device comprises a hand-held digital tape measure having a measuring tape with regularly-spaced apertures, constructed so as to pass through a sensor assembly when the tape is withdrawn from an aperture in the tape container. The sensor assembly preferably includes a series of regularly-spaced light emitting diodes ("LEDs"), with photosensitive detectors aligned opposite the LEDs. The spacing of the apertures on the tape and the emitter/detector pairs is designed so that the photosensitive detectors are activated as the tape is extended, thereby determining the length of the extended tape. It is preferred that the tape is wound on an enclosed spring-loaded reel mechanism, and that the sensor assembly is activated as the tape is withdrawn from the enclosed reel assembly.

The digital information from this device is then transmitted to a control and display unit which multiplies or converts the data as needed and which can print a record of or display all desired measurements from a particular object or person. This control and display unit can be an attached control module, or a personal computer with a stand-alone printer, or alternatively it can be enclosed with the tape and reel assembly itself. It is further intended that external power sources can be attached directly to the digital measuring system, or alternatively that the present invention can operate as a battery-powered system.

It is not intended that the present invention be limited by the specific construction or combination of the various components of the system. It is only intended that all separate elements will be modular in design so that they can be fully interchangeable and transportable. Other and further objects, features, advantages and embodiments of the present invention will become apparent to one skilled in the art from reading the detailed description of the invention together with the drawings.

DETAILED DESCRIPTION OF THE INVENTION

Figure 1:
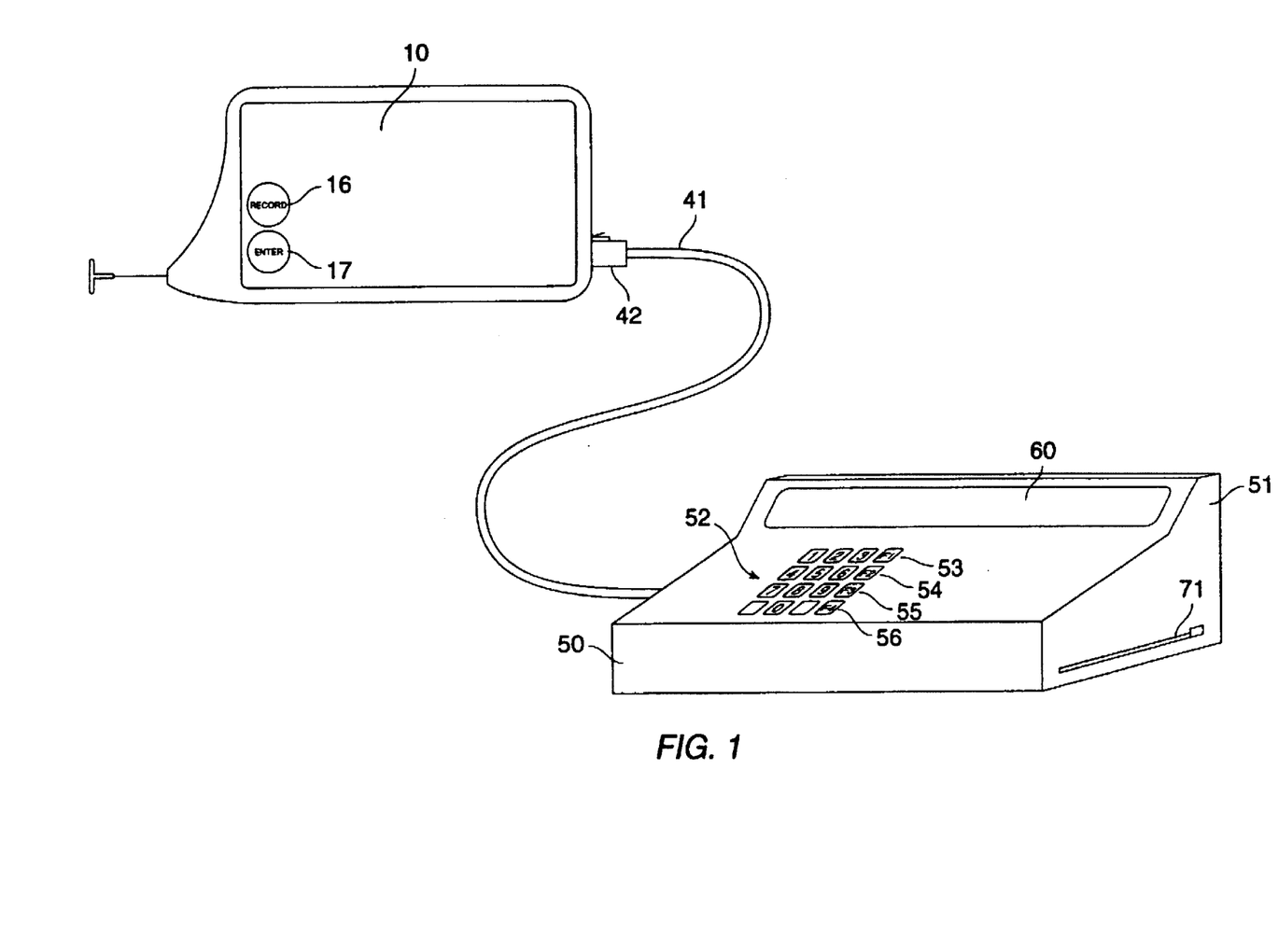
FIG. 1 is a schematic view of the components of the present digital measuring system invention.

As shown in FIG. 1, the digital measuring system of the present invention comprises a digital measuring device coupled with means for controlling, displaying and recording the information obtained by use of the digital measuring device. The description of the invention is divided for convenience into three parts: I) The Digital Tape Measure; II) The Control and Display Apparatus; and III) Applications of the Digital Measuring System.

I. The Digital Tape Measure

Figure 2:
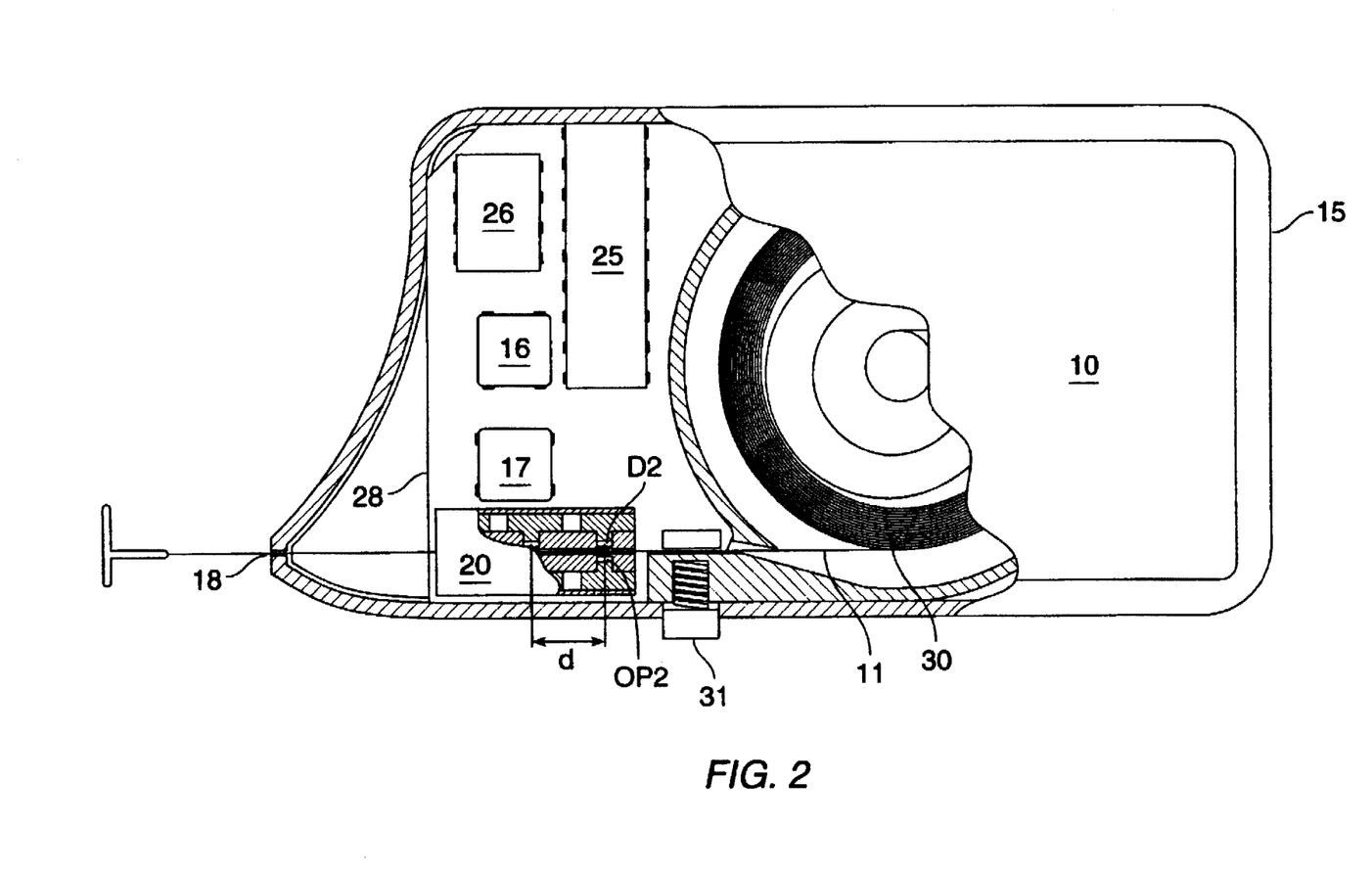
FIG. 2 is a cut-away cross-sectional view of one embodiment of the digital tape measure of the present invention.

The structure of an exemplary embodiment of the digital tape measure according to the present invention is shown in FIG. 2. The digital tape measure (10) is generally comprised of an elongated tape (11) with regularly-spaced apertures (12–14) (see FIG. 3), designed and constructed so as to pass through a sensor assembly (20) when withdrawn through an aperture (18) in an enclosed protective case (15). The tape apertures (12–14) are spaced along the tape so as to enable detection by the sensor assembly (20) of both the zero point when the tape (11) is fully retracted within the case (15), and the length of extension of the tape (11) when it is withdrawn from the case (15), in a manner to be subsequently described.

The tape (11) can be constructed of any semi-rigid material, such as a narrow, elongated metal strip, and in a preferred embodiment, would include graphical markings for distance measurements, such as inches and centimeters. Likewise, the protective case (15) can be constructed of any substantially rigid material such as plastic or metal. It is further contemplated that the tape (11) can be wound onto a conventional spring-loaded reel mechanism (30), and that a conventional brake release button (31) on the outside of the protective case (15) would operate with the spring-loaded reel mechanism (30) to rewind the tape (11) from its extended position to a fully-retracted position, in any manner well-known in the art.

In one embodiment of the present invention it is contemplated that the sensor assembly (20) would be generally composed of a series of light emitting diodes ("LEDs") (D1–D3) and photosensitive detectors (OP1–OP3) (see FIG. 4), aligned directly opposite each other in pairs in the sensor assembly (20) and spaced apart from center-to-center by a uniform distance d. It is contemplated that any conventional light emitting diode and any conventional photosensitive detector, such as a phototransistor, may be incorporated into the sensor assembly (20) of the present invention. In the preferred embodiment shown in FIGS. 2 and 4, the sensor assembly (20) consists of three emitter/detector pairs spaced apart by ¼ inch, with a constant current resistor to set the intensity of the LED transmitters and thereby control the sensitivity of the sensors.

The tape (11), as previously noted, includes apertures (12–14) formed therethrough at regular intervals. See FIG. 3. When unwound from the reel mechanism (30) and withdrawn from the protective case (15), the tape (11) passes through the sensor assembly (20) and between the LED and detector pairs (D1–D3 & OP1–OP3). The LEDs (D1–D3) generate light which passes through the apertures (12–14) and is detected by the opposing photosensitive detectors (OP1–OP3), as demonstrated in FIG. 3. When an aperture (12–14) is not adjacent to one of the LEDs (D1–D3), light is not admitted to the opposing photosensitve detector (OP1–OP3). In this way, the emitter/detector pairs of the present invention are able to determine the length of the tape (11) unwound from the reel mechanism (30).

Figure 3:
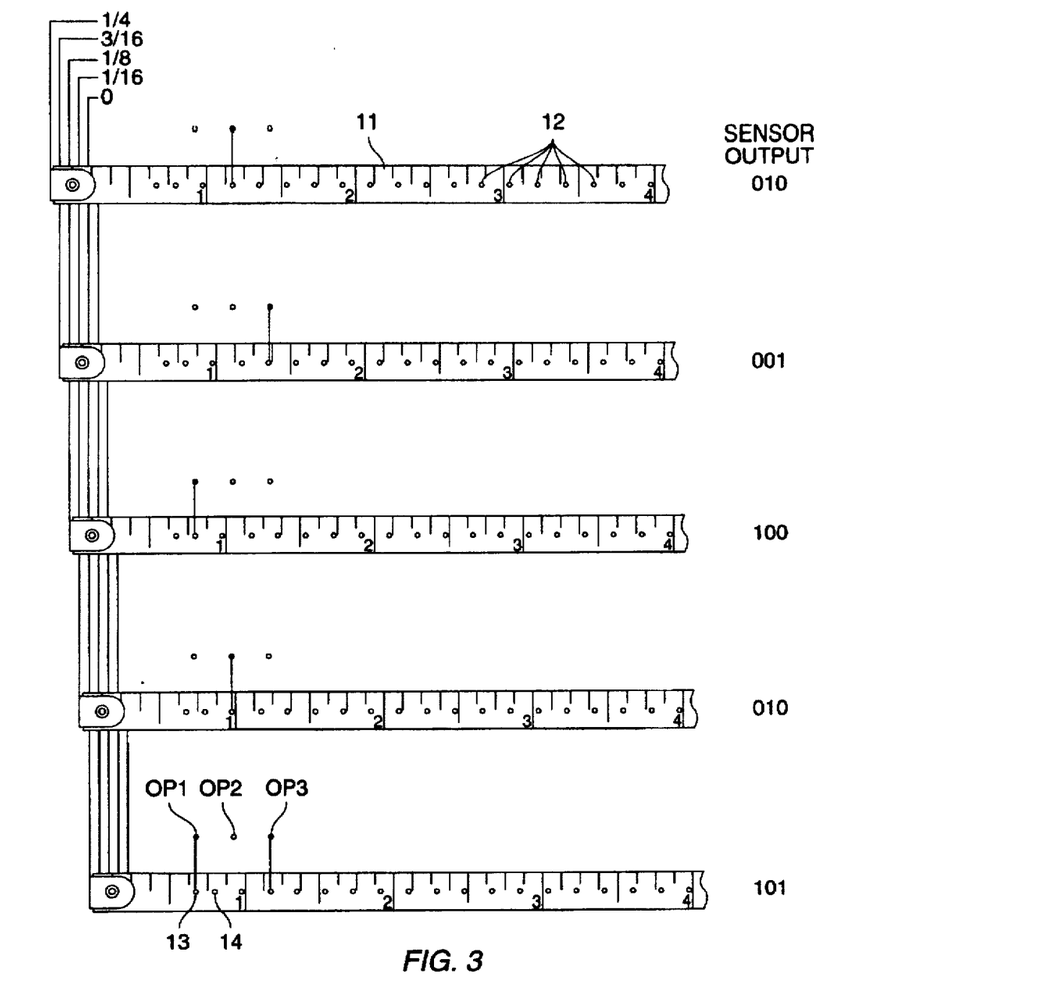
FIG. 3 is a schematic diagram demonstrating the sensor assembly output corresponding to the activation of the phototransmitters at subsequent length extensions of the tape.

As shown in FIG. 3, in the preferred embodiment the first two apertures (13) and (14) on the tape are spaced apart by ⅛ inch, and each succeeding aperture (12) is spaced apart by 3/16 inch. Thus, each 1/16th inch of movement of the tape results in allowing the passage of light from one of the LEDs (D1–D3) to one of the detectors (OP1–OP3), thereby yielding one count which is stored in the attached circuit for movement of each 1/16th inch. The output from the sensor assembly for each consecutive 1/16th inch passage of the tape (11) is demonstrated in FIG. 3. In addition, the two initial apertures (13) and (14) allow the passage of light to the two detectors (OP1) and (OP3) simultaneously, creating a unique sensor output that signals the fully retracted position of the tape (11).

The present invention includes the above-described method of electronically determining the passage of a measuring tape (11) through a sensor assembly (20). It is not intended, however, that the sensor assembly (20) of the present invention be limited solely to the use of regularly-spaced LEDs and photosensitive devices to detect corresponding apertures on the measuring tape (11). Rather, it is contemplated that alternative mechanisms can be incorporated into the apparatus and methods of the present invention to achieve the same result, such as magnetic or mechanical detectors in the sensor assembly (20) to detect corresponding magnetic or mechanical markers on the measuring tape (11).

Figure 4:
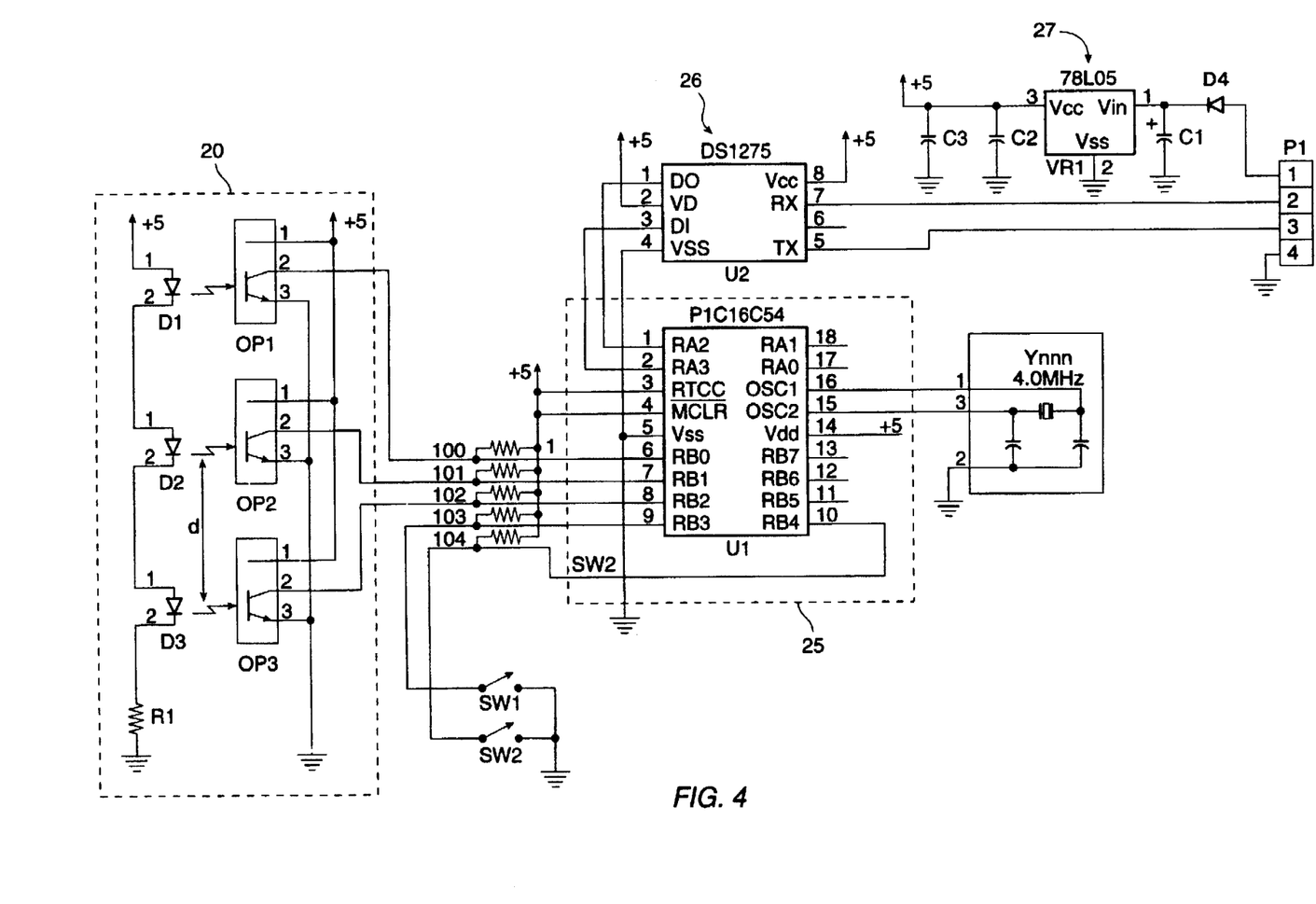
FIG. 4 is a schematic diagram of the electronic circuitry of the present invention.
Figure 5:
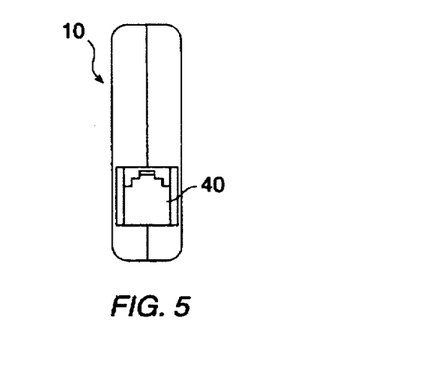
FIG. 5 is an end-view of one embodiment of the digital tape measure of the present invention.

FIG. 4 illustrates a schematic diagram of one embodiment of the sensor assembly (20) and the circuitry coupled thereto. The output from the sensor assembly (20) is coupled to a microprocessor (25) which is programmed to control all functions and communication activities in the digital tape measure (10). In the preferred embodiment the microprocessor (25) is a PIC16C54 microprocessor, which can be obtained from Microchip Technology, Inc., Chandler, Ariz. Switches (SW1) and (SW2) are further coupled to the microprocessor (25) and allow a user to enter and record a measurement into the microprocessor (25). Resistors (100–104) are further coupled to the outputs of the sensor assembly (20) and the switches (SW1,SW2), tying them to a +5 voltage. A crystal resonator circuit (Ynnn) is also contemplated to provide clock pulses to the microprocessor (25).

It is further contemplated that a serial interface circuit (26) is coupled to the microprocessor (25) to provide interface with an external control and display means. In the preferred embodiment shown in FIG. 4, the serial interface (26) is a line-powered RS-232 transceiver chip such as the DS1275 circuit, which can be obtained from Dallas Semiconductor, Dallas, Tex. RS 232 signals can be transmitted and received at 1200 baud, 8 bits per character, no parity with a 1 stop bit. The interface circuit (26) is also tied to the +5 voltage and is coupled to the external connector pins (P2 and P3) for receipt of power and for two-way communication with the control and display means. Also in the preferred embodiment, a 5-volt constant voltage regulator (27) is coupled to receive power from the connector pin P1. A diode D4 is coupled between the input of the regulator (27) and the connector pin P1. Furthermore, a capacitor C1 ties the input to the regulator (27) to ground. The output from the regulator (27) is also tied to ground through two capacitors C2 and C3.

As noted above, it is also contemplated in the preferred embodiment that switches (16) and (17) can be incorporated into the digital tape measure (10) to control several functions, such as signaling the microprocessor (25) to transmit an ASCII string that represents the present tape position, and to record the data output from the sensor assembly (20). See FIGS. 2 & 4. It is not intended, however, that the present invention be limited to the specifications described for this particular embodiment. Rather, it is contemplated that any appropriate microprocessor and associated hardware can be incorporated into the PC Board (28) of the digital tape measure (10).

The digital tape measure (10) is most preferably modular in design for ease of connection with other components, such as, for example, various stand-alone control and display means (50, 60), and accordingly the preferred embodiment shown in FIG. 4 incorporates a conventional, telephone jack-type modular connector (40) on the side of the digital tape measure (10) opposite the tape extension point or aperture (18) in the protective case (15). As shown in FIG. 1, a modular cable (41) is also contemplated to connect the digital tape measure (10) with the control module (50) or other computer. In the preferred embodiment described herein, this cable would have quick disconnect connectors (42) at each end, and four wires, one for a power supply, one for a ground, as well as one each to transmit to and receive from the digital tape measure (10).

It is not intended that the present invention be limited by the power sources of the digital tape measure (10). Rather, it is contemplated that a power source can be attached directly to the digital tape measure (10) via the modular connector (40) and cable (41) as described above, or alternatively that the present invention can be easily modified to operate as a battery-powered system.

II. The Control and Display Apparatus

The present invention also includes a means for controlling, manipulating, displaying and recording the information received from the digital tape measure (10). In the preferred embodiment shown in FIG. 1, there is a control module (50) having circuitry for manipulating and recording the data received from the digital tape measure (10). This control module (50) further incorporates a display means (60) and a recording or digital storage means (70). It is contemplated that the circuitry in the control module (50) can be programmed to record any number of measurements with the digital tape measure (10), sequential or otherwise, and further can be programmed to convert or manipulate these measurements as necessary for the individual task.

Figure 6:
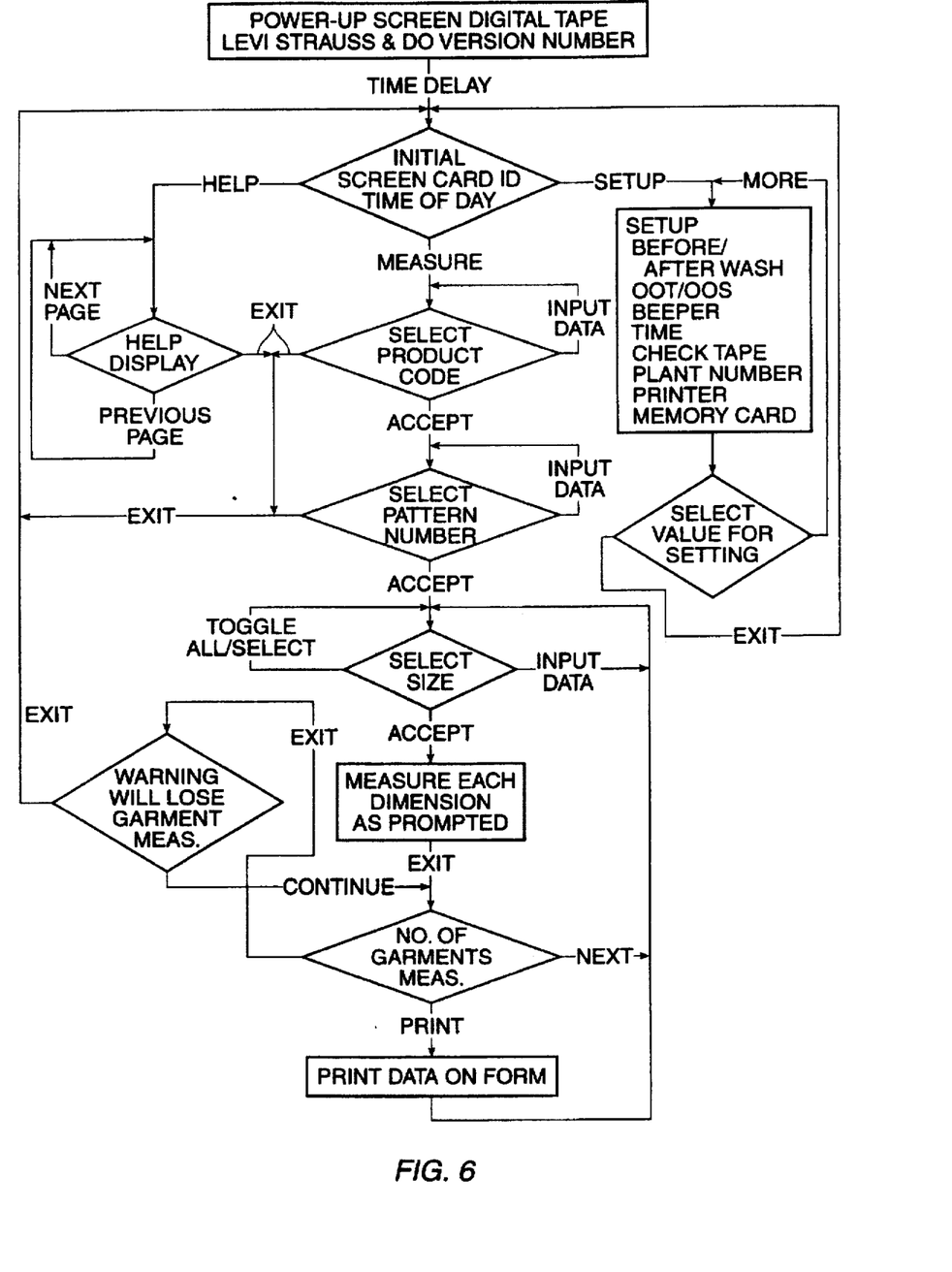
FIG. 6 is one embodiment of a logic diagram for the control module of the present invention.

One embodiment of the programming logic contemplated by the present invention is shown in FIG. 6, which is designed for performing audit measurements on manufactured garments. A power-up screen for the display means (60) is provided which displays information identifying the control module (50), and an initial screen displaying the Card ID and the time of day subsequently appears upon activation of the unit. As shown in FIG. 1, a numerical keypad (52) and number of function buttons (53, 54, 55, 56) are also contemplated to allow the operator to select either a Help function, a Setup function or a Measure function.

As shown in FIG. 6, the Help function is a loop that allows the operator to access sequential help text screens or to exit back to the initial screen. The Setup function is also a loop that allows the operator to input and select the desired settings for the control module (50). In the preferred embodiment the settings can include selecting before and/or after wash measurements as well as out of tolerance and/or out of specification calculations, enabling a beeper or similar audible signal, checking the time, checking the tape position, inputting the plant number, and finally activating a printer and/or a memory card option. The operator can cycle through each setting and select or input a value for each one, using the keypad (52) and function buttons (53–56) as prompted, or exit back to the initial screen after any number of settings are selected or input.

As shown in FIG. 6, when the Measure function is selected, the control module prompts the operator for the pattern number of the garment, and then the size, which the operator inputs and accepts using the keypad (52) and function keys (53–56). The program also contemplates an option to measure "All" dimensions for a particular garment, or alternatively the operator can "Select" a subset of the measurements to be taken, for example, only the waist and inseam. The control module (50) will then prompt the operator to measure each selected dimension of the garment, and the operator can then take each desired measurement using the digital tape measure (10), in a manner to be subsequently described. After all measurements for one garment have been taken and input to the control module (50), the operator can then select either to repeat the Measure function for an additional garment, to print the data obtained thus far, or to exit the Measure function without printing, in which case the control module (50) will generate a warning to the operator about the potential loss of the measurement data.

It is not intended, however, that the program logic of the present invention be limited to the particular embodiment described above. Rather, it is contemplated that many additional programming options can be incorporated into the measurement audit program logic disclosed herein. It is also contemplated that the control module (50) or other computer/controller incorporated into the present invention can be programmed to accommodate the many alternative uses of the digital tape measure (10), such as, for example, taking and recording individual customer measurements as described in more detail below.

In the preferred embodiment in FIG. 1, the display means (60) comprises a conventional liquid crystal display on the upper face of the control module (50). This display provides an easy to read display of the various programming options for the control module (50), as well as the current tape extension data input from the digital tape measure (10). Similarly, in the preferred embodiment of the control module (50) the recording means (70) comprises a conventional PC-Card or PCMCIA ROM/RAM storage system incorporated into the control module (50), with a conventional PC-Card port (71) on the side panel (51) of the control module (50). It is contemplated, however, that any conventional display means (60) or recording means (70) well known in the art can be incorporated into the control module (50) to perform the display and recording functions.

Moreover, it is not intended that the present invention be limited by the type of control module operated with the digital tape measure (10). Rather, it is contemplated that the digital tape measure (10) can be either used as is or modified for connection to a personal computer or other computer/controller, with or without an attached printer, or alternatively that the digital tape measure (10) can be constructed with its own internal control module and a graphic display, such as a small liquid crystal display mounted on the protective case (15).

III. Applications of the Digital Measuring System

The present patent contemplates the use of the technology as a general method for accurately and efficiently measuring distances and the dimensions of objects and people. The following examples are intended to demonstrate some of the many applications of this invention to solve the problems created by prior art measurement techniques.

A. Measurement Audit

As noted above, it is critical for garment manufacturers to periodically audit their products during the various manufacturing stages, e.g. sewing, washing, etc., to ensure that the finished product meets the size specifications for that particular garment. In the application of the present invention to a garment measurement audit the control and display apparatus can be programmed with the applicable size specifications, so that a warning can be generated if a measurement is input from the digital tape measure (10) (hereinafter the "DTM") that is not within the approved specification (i.e. "out of spec"), or alternatively one that is out of the acceptable range of tolerance, or both. These programmed specifications can also reflect the measurement requirements from specific points in the manufacturing cycle, for example to reflect either before wash and after wash measurements, or both. In addition, the measurements taken with the DTM (10) can be automatically doubled by the control and display apparatus when needed to provide the appropriate measurement (e.g. double the distance when measuring waist size, cuff opening, etc., on a flattened pair of trousers).

The particular application described in this example is an Out of Tolerance (OOT) audit of a pair of trousers. In this specific application the auditor first programs the control module (50) to calculate and display an Out of Tolerance measurement, and also selects after-wash measurements. The auditor uses the numerical keypad (52) and the function keys (53, 54, 55, 56) on the control module (50) to enter the commands and information necessary in order to program the apparatus, as described above. Using the function keys, the auditor also enables a sonic beep or other audible signal that will be activated when the input measurement is calculated to be out of the acceptable range of tolerance.

The auditor then selects the garment to be measured, and inputs the product code, pattern number, size and inseam length into the control module (50), again using the function keys (53–56) and the numerical keypad (52). In this example, the auditor input the product code (10550-0291), the pattern number (04), the size (13) and the inseam (medium). The display registers and verifies each of these items as they are input into the control module (50). The auditor also has the option to select some or all of the appropriate measurements for a particular garment, and in this example chooses the complete full body measurement option.

The auditor marks and orients the garment for measurement by placing it on a flat surface, such as a table top, in a position to measure the garment at the desired location. Beginning with the waist, the DTM (10) is picked up and the tape (11) is extended across the waist of the trousers, starting at a side edge of the garment. The retracting switch (31) on the DTM (10) is depressed until the aperture (18) of the DTM (10) is positioned at the opposite side edge of the garment. Once the DTM (10) is in position, the auditor can then depress the enter button (17) shown in FIG. 1 to transmit the side-edge-to-side-edge measurement from the DTM (10) to the control module (50), which in this example was 16 and 3/16 inches. Since the actual measurement is one-half the waist measurement, the control module is programmed to automatically double the measurement, compare the measurement against the programmed specifications, apply the tolerance limits and calculate the in or out of tolerance measurements.

The control module (50) also displays the actual measurement data (32 3/8") and specification data (32 1/2") on the visual display (60), and provides a single, audible sonic beep if the measurement is in tolerance, or a double sonic beep if the measurement is out of tolerance. (See OOT Audit Record in FIG. 7, columns 3 and 4). In this example only a single beep was heard, indicating that the measurement was within the tolerance limits of +1/2" and −1/2". (See FIG. 7, column 2). The auditor then records the information in memory by depressing the record switch (16) on the DTM (10). Once the data is recorded, the control module (50) is ready to receive the next measurement to be taken, and displays the next programmed specification value.

The next measurement was the high hip measurement, and the auditor followed the same steps as outlined above for the waist measurement. The garment was marked and positioned so that the auditor could measure from side-to-side across the upper hip on the trousers, and using the DTM (10) the auditor measured and transmitted an actual measurement of 19 and 3/8 inches by pressing the enter switch (17). The control module automatically doubled this measurement and displayed both the specification value (38 5/8") and the actual garment value (38 3/4"), and emitted a single beep to indicate that the actual value was again within the tolerance limits.

Figure 7:
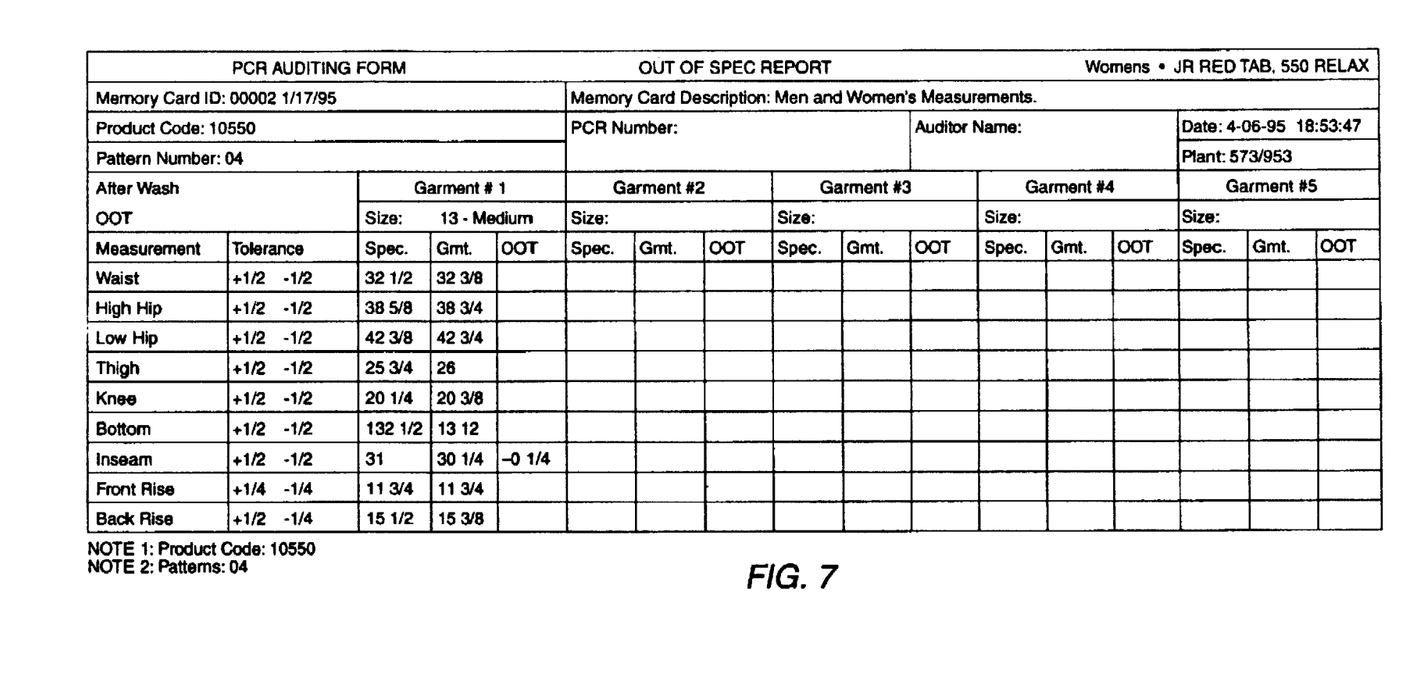
FIG. 7 is one example of a printed record of measurement data obtained by the use of the present invention.

After the high hip measurement value was properly measured and recorded, the auditor proceeded to measure and transmit in order each of the subsequent measurements to be taken in a full body measurement: the low hip (21 3/8"); the thigh (23"); the knee (10 3/16"); the bottom leg opening (6 3/4"); the inseam (30 1/4"); the front rise (11 3/4"); and the back rise (15 5/8"). The low hip, thigh, knee and bottom leg opening measurements were automatically doubled by the control module, whereas the inseam, front rise and back rise were single measurement values and were not doubled. The transmitted data was then displayed and subsequently recorded as shown in FIG. 7.

When the inseam measurement was taken as outlined above, two audible beeps were heard, indicating that the actual measurement value for the inseam was outside the tolerance limits for this particular garment. The auditor then remeasured the inseam measurement area with the DTM (10), transmitted the data to the control module (50) using the enter button (17), and again a double beep was generated for an out of tolerance measurement. This data was then recorded by the auditor by pressing the record switch (16). The remainder of the measurements taken in this example produced only a single beep, indicating that they were within the tolerance limits. See FIG. 7.

When the final measurement (the "back rise") was taken and recorded, the control module (50) generated two loud beeps to denote that the last measurement area of the garment had been recorded. The auditor then printed a record of the garment measurements, as shown in FIG. 7. The printout reflects the product code, the pattern number, the after wash selection, the plant and laundry numbers, and the date and time, as well as each measurement area, tolerance limit, specification value, actual garment measurement, and out of tolerance amount. This printout can then be attached to the individual garment or used for other auditing or record-keeping procedures. It is also contemplated that the data can be stored on the memory card (71) or transmitted to a computerized database by a serial port, for future statistical analysis or other use.

B. Customer Measurements

The present invention will also allow for the individual measurement of customers by tailors or others involved in fitting and manufacturing custom or tailored garments. It is contemplated that clothing customers can be measured by retail personnel using the digital tape measure (10) of the present invention, which can quickly and accurately transmit the information into a computer database and provide more accurate measurements than has hitherto been possible.

With the present invention both skilled and unskilled retail personnel can save time and effort in taking the necessary measurements, and the customer is spared both potential mistakes and time-consuming repeat measurements, since recording errors are avoided by transmitting the data directly to a computer/controller. It is further contemplated that the computer/controller can be programmed, for example, to seek information regarding personal fit preferences, or alternatively it can use conventional programs to create patterns or scale patterns, or match the customer to preexisting patterns or garments of known dimensions for point-of-sale fitting and sales, or for transmission to off-site custom garment manufacturing facilities. In addition, information regarding customers can be stored, and this personal measurement database can then be accessed at a later point should the customer wish to purchase additional clothing products.

As one skilled in the art will readily recognize, this invention has many possible applications in addition to those outlined above, including use for measuring and recording any distance, dimension or object in any number of industrial or manufacturing situations. Moreover, while the invention has been described in terms of the preferred embodiment, one skilled in the art will recognize that it would be possible to construct the elements of the present invention from a variety of materials and to modify the placement of the components in a variety of ways. For example, as described above, the control and display means can comprise a separate control module (50), or alternatively they can be incorporated into the hand-held digital measuring tape (10) itself. While the preferred embodiments have been described in detail and shown in the accompanying drawings, it will be evident that various further modifications are possible without departing from the scope of the invention as set forth in the following claims.

We claim:

1. A digital measuring system comprising:
  a. a case having an opening;
  b. a measuring tape housed within the case, said measuring tape having a first end, a second end, and a plurality of regularly spaced measuring apertures each of which are spaced apart from an adjacent perforation by a first distance, the first end extending out through the case opening and the second end coiled within the case;
  c. a recoil means coupled to the second end of said measuring tape for recoiling said measuring tape back into the case after the first end of said measuring tape has been pulled away from the case opening,
  d. means for determining and recording the length of said measuring tape which extends outside of the case, said means including an electronic sensing means which detects the passage of predetermined increments of said tape, said electronic sensing means comprising a plurality of regularly-spaced optical sensors for sensing the passage of the measuring apertures, each of said sensors spaced from an adjacent sensor by a second distance, said second distance being smaller than said first distance and
  e. a means for determining when the measuring tape is fully retracted, said means comprising at least two signal apertures located between said first end of said measuring tape and a first of said plurality of measuring apertures, said two signal apertures spaced from each other by said second distance whereby when said measuring tape is fully retracted, said signal apertures will be aligned with two adjacent optical sensors for generating a unique signal.

2. The digital measuring system of claim 1 wherein said first distance is about 3/16 inch and wherein said second distance is about 1/8 inch and wherein said predetermined increments are about 1/16 inch.

3. The digital measuring system of claim 1 additionally including a controller for processing a signal representative of the length of said measuring tape extending outside said case, and a means for transmitting said signal from said electronic sensing means to a controller located outside of said case.

4. The digital measuring system of claim 3 additionally including preprogrammed instructions for prompting a user of said system to take specific measurements.

5. A digital measuring system, comprising:
  a. a recoilable measuring tape having a plurality of regularly-spaced markers;
  b. a case enclosing said recoilable measuring tape;
  c. an electronic sensing means within said case for transmitting a signal corresponding to the incremental passage of said regularly-spaced markers as said recoilable measuring tape is withdrawn from an aperture in said case to perform a measurement;
  d. a microprocessor for receiving said signal from said electronic sensing means and transmitting data corresponding to a measurement value; and
  e. a control module for receiving said data from said microprocessor, comparing said corresponding measurement value with a predetermined requirement, and recording said corresponding measurement value in response to user input.

6. The digital measuring system of claim 5, wherein said control module additionally includes a means for generating a warning to said user when said corresponding measurement value does not meet said predetermined requirement.

7. The digital measuring system of claim 5, additionally including a means in communication with said control module for storing predetermined requirements which can be selected by a user prior to performing said measurement.

8. The digital measuring system of claim 5, wherein said corresponding measurement value comprises one or more dimensions of a manufactured garment.

9. The digital measuring system of claim 8, wherein said control module additionally includes pre-programmed instructions for prompting a user to measure said one or more dimensions of a manufactured garment.

10. The digital measuring system of claim 8, wherein said control module additionally includes pre-programmed instructions for automatically doubling said corresponding measurement value for certain of said dimensions prior to comparing said corresponding measurement value with said predetermined requirement.

11. The digital measuring system of claim 5, wherein said markers on said recoilable measuring tape further comprise a plurality of measuring apertures spaced apart by a predetermined first distance, and said electronic sensing means further comprises:
  a. a plurality of light emitting means spaced apart by a predetermined second distance; and
  b. a plurality of light detecting means positioned opposite said light emitting means such that said recoilable measuring tape is able to pass therebetween allowing light to pass from said light emitting means to said light detecting means whenever said measuring apertures align with said light emitting means and their corresponding light detecting means.

12. The digital measuring system of claim 11, wherein said first distance and said second distance are different.

13. The digital measuring system of claim 12, additionally including a means for determining when the measuring tape is fully retracted, comprising at least two signal apertures adjacent to the first end of said measuring tape, said apertures spaced apart by said second predetermined distance and positioned to permit the light from at least two adjacent light emitting means to be simultaneously received by at least two of said light detecting means for generating a unique signal when said measuring tape is fully retracted.

14. The digital measuring system of claim 5, further comprising a first switch means coupled to said microprocessor to signal said microprocessor to transmit said data to said control module, and a second switch means coupled to said microprocessor to signal said control module to record said corresponding measurement value.

15. A digital measuring system, comprising:
   a. a hand-held measuring device capable of generating an electronic signal representative of a measured dimension on a preselected object;
   b. a controller located at a work station;
   c. a means for transmitting said electronic signal from said hand-held measuring device to said controller;
   d. a device in communication with said controller for storing and accessing predetermined information relating to optimum dimensions of said object, and for storing and accessing instructions for (1) prompting a user to measure a predetermined point on said object using said hand-held measuring device, (2) transforming the signal generated at said predetermined point to calculate a measured dimension, (3) comparing each said measured dimension with said optimum dimension at said predetermined point, and (4) generating a signal representative of the difference between the measured dimension and the optimum dimension; and,
   e. a feedback means in communication with said controller for providing feedback to a user.

16. The digital measuring system of claim 15, wherein said means for transmitting said electronic signal is a cable electronically connected at one end to said hand-held measuring device and at an opposite end to said controller.

17. The digital measuring system of claim 15, wherein said controller is a personal computer.

18. The digital measuring system of claim 15, wherein said preselected object is a pair of jeans.

19. The digital measuring system of claim 15, additionally including an input means in communication with said controller.

20. The digital system of claim 19, wherein said input means is one or more selected from the group consisting of: touchscreens, keyboards, and scanners.

21. The measuring system of claim 15, wherein said feedback means is one or more selected from the group consisting of sound generators, visual display screens and printers.

* * * * *